United States Patent Office 3,565,755
Patented Feb. 23, 1971

3,565,755
ROSIN SIZE AND PAPER CONTAINING SAID SIZE
Robert W. Davison, North Hills, Wilmington, Del., assignor to Hercules Incorporated, Wilmington, Del., a corporation of Delaware
No Drawing. Continuation-in-part of application Ser. No. 522,361, Jan. 24, 1966. This application Mar. 27, 1969, Ser. No. 811,188
Int. Cl. D21d 3/00
U.S. Cl. 162—168
8 Claims

ABSTRACT OF THE DISCLOSURE

A material such as a salt of rosin or a salt of an adduct reaction product of rosin and an acidic compound containing the

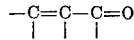

group, such as maleic anhydride and fumaric acid, or an alkaline material, such as potassium hydroxide, is dissolved in water. The resulting aqueous solution is mixed with a soluton of a water-immiscible organic solvent, such as benzene, which has dissolved therein rosin-base material comprised of 0–95% rosin and 100–5% of an adduct reaction product of rosin and an acidic compound containing the

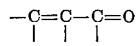

group, such as that obtained by adducting wood rosin with fumaric acid; the amount of said material dissolved in water being sufficient to provide an amount of saponified rosin-base material, represented as a percentage of available carboxyl groups saponified, of from about 0.5% to about 20%. The unstable mixture is homogenized to produce a stable emulsion and then the organic solvent is removed by distillation to result in a stable aqueous dispersion.

---

This application is a continuation-in-part of application Ser. No. 522,361, filed Jan. 24, 1966, now abandoned.

This invention relates to novel compositions of matter in the form of aqueous suspensions comprised of specific resinous materials and to the method of preparing the compositions of matter.

This invention relates also to the use of the novel compositions of matter in the manufacture of paper products such as paper sheeting and to the paper products thus produced.

The aqueous suspensions of this invention have particular utility in the manufacture of sized paper, papermaker's alum (aluminum sulfate) or a similar precipitating agent being sometimes used in conjunction therewith to assist in precipitating the rosin and the adduct on the paper fibers. The suspensons of this invention can be used in internal sizing techniques and in external sizing techniques. In internal sizing, the suspension and alum are preferably added separately to an aqueous dispersion of papermaking fibers at various stages prior to sheet formation, and, in external sizing, paper sheeting is first formed, and subsequently treated by known methods, with the aqueous suspension to provide sized paper. Using the aqueous suspensions of this invention, paper products, such as paper sheeting, having improved resistance to penetration by water and aqueous ink compositions can be prepared.

The novel compositions of matter of this invention are substantially homogeneous stable aqueous suspensions of finely divided particles having a particle size of from about 0.03 micron to about 3 microns.

The aqueous suspensions can be comprised of, by weight, from about 95% to about 40% water and from about 5% to about 60% solids. Preferred suspensions will be comprised of, by weight, from about 70% to about 55% water and from about 30% to about 45% solids, the solids being rosin-base material.

Rosin-base materials form the solids content of the suspension and are, by weight, (A) 0% to about 95% rosin and (B) 100% to about 5% of an adduct reaction product of rosin and an acidic compound containing the

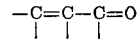

group. Aqueous suspensions will provide good sizing results when the amount of adducted acidic compound is from about 1% to about 20% of the solids weight. Best sizing results are obtained when the amount is from about 4% to about 8%. A relatively small amount of rosin-base material is saponified, and functions as dispersing agent for the suspension. The amount of saponified material, represented as a percentage of available carboxyl groups saponified, can be as little as about 0.5% and as high as about 20%; while in preferred suspensions the percentage of available carboxyl groups saponified will be from about 2% to about 4%.

Broadly, the method of this invention comprises preparing an essentially unstable oil-in-water emulsion by mixing together (1) an aqueous medium comprised of (a) water, and dissolved therein, (b) a material selected from the group consisting of (i) salts of rosin, (ii) salts of an adduct reaction product of rosin and an acidic compound containing the

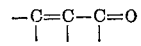

group, (iii) an alkaline material capable of forming a salt with rosin and rosin adducts when in admixture and (iv) mixtures of two or more, and (2) a solution of rosin-base material dissolved in a water-immiscible organic solvent (c), said rosin-base material being comprised of, by weght, (a) 0% to about 95% rosin and (b) 100% to about 5% of an adduct reaction product of rosin and an acidic compound containing the

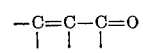

group. A stable oil-in-water emulsion is prepared by homogenization of the unstable emulsion. Salts of rosin and salts of the adduct, sometimes called "saponified material," serve as emulsifying agent for the emulsion. Substantially all solvent (c) is then removed from the emulsion, removal by distillation being the preferred method, either at atmospheric pressure or subatmospheric pressure, whereby there is provided an aqueous suspension that is substantially homogeneous and which has excellent stability for prolonged periods of time. The saponified material, that is, the salt of rosin and/or salt of adduct reaction product now serves as a dispersing agent in the aqueous suspension.

By employing the method of this invention, it is possible to prepare aqueous suspensions containing relatively large amounts of up to about 60% of the weight of the aqueous suspension of suspended particles.

The particles comprising the dispersed phase are relatively small and have a particle size of from about 0.03 micron to 3 microns. At least about 20% by weight of the suspended particles have a particle size of less than about 0.3 micron.

Rosin component (A), when present, can be any of the commercially available types of rosin such as wood rosin, gum rosin, tall oil rosin, and mixtures thereof, in their crude or refined state. Partially or substantially completely hydrogenated rosins and polymerized rosins, as well as rosins that have been treated to inhibit crystallization, such as by heat treatment or reaction with formaldehyde, can be used as the rosin component (A) as well as mixtures thereof.

The adduct reaction product of rosin and an acidic compound containing the

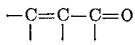

group is derived by reacting rosin and the acidic compound at elevated temperatures of from about 150° C. to 210° C. Methods of preparing these adduct reaction products are disclosed and described in Pats. 2,628,918 and 2,684,300. These adduct reaction products are often referred to in the art as Diels-Alder reaction products. The adduct reaction products are hereinafter sometimes referred to as "rosin adducts," "adducts," and "fortified rosin."

Examples of acidic compounds containing the

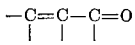

group that can be used to prepare the adducts include the α,β-unsaturated polybasic organic acids and their known anhydrides, specific examples of which include fumaric acid, maleic acid, acrylic acid, maleic anhydride, itaconic acid, itaconic anhydride, citraconic acid and citraconic anhydride.

The rosin used to prepare the adduct can be any of the commercially available types of rosin such as wood rosin, gum rosin, tall oil rosin, and mixtures thereof in their crude or refined state. Polymerized rosin and partially hydrogenated rosin can be used as well as rosin treated to inhibit crystallization. Also, it is possible to employ as component (B) an adduct that has been substantially completely hydrogenated after adduct formation.

The preferred aqueous medium for use in carrying out the process of the invention is an aqueous solution of an alkaline material. Suitable alkaline materials include the usual inorganic and organic basic materials employed to form a rosin or adduct salt. Examples of such alkalies include lithium hydroxide, sodium hydroxide, potassium hydroxide, lithium carbonate, sodium carbonate, potassium carbonate, ammonia, and water-soluble amines such as morpholine, ethylamine, n-propylamine, and n-butylamine. Preferred solutions for carrying out the process are prepared by dissolving either potassium hydroxide or sodium hydroxide in water.

Salts derived by reaction of rosin or rosin adduct and an alkali as above described by known methods can be used to prepare the initial aqueous medium if desired. Thus, for example, sodium resinate can be prepared by adding a hot aqueous solution of sodium hydroxide to fused rosin and maintaining the temperature of the reaction mass at about 110° C. until reaction is substantially complete.

Solution (2) is prepared by dissolving rosin and the adduct in a substantially water-immiscible organic solvent. The amounts of rosin and reaction product employed will be that required to provide an aqueous emulsion of desired composition. Suitable solvents include propylene dichloride, benzene, toluene, n-heptane, and carbon tetrachloride. Benzene is the preferred solvent.

The components of which the aqueous suspension of this invention is comprised can all be derived from the same or different rosin source. Thus, for example, rosin component (A) can be a mixture of substantially completely hydrogenated wood rosin and unrefined wood rosin, adduct component (B) can be an adduct of unrefined wood rosin and fumaric acid, and the saponified material which functions as the dispersing agent can be the sodium salt of gum rosin. If desired, component (A) can be polymerized wood rosin, adduct component (B) can be the adduct of polymerized wood rosin and maleic anhydride, and the saponified material can be the potassium salt of tall oil rosin. In another example, component (A) can be a mixture of partially hydrogenated wood rosin and tall oil rosin, adduct component (B) can be the adduct of partially hydrogenated wood rosin and fumaric acid, and the saponified material can be the potassium salt of hydrogenated wood rosin. Other and various combinations of the components will be apparent from the working examples.

As above set forth, the aqueous suspensions of this invention have particular utility in the sizing of paper. In this regard the amount of adducted acidic compound and the amount of saponified material present are important. It will be understood that substantially all of the acidic compound is reacted or adducted with rosin and is present in the form of an adduct with rosin. Thus, in the examples that follow, the amount of acidic compound present in the final product is given as percent by weight and it will all be present substantially in the adducted form. The amount of acidic compound in the aqueous suspension can be from about 1% to about 20%, and preferably will be from 4% to 8%, by weight, of the total solids weight.

The amount of saponified material, that is, the amount of rosin salt and/or salt of rosin adduct, present in the aqueous suspension which functions as the dispersing agent will be that which provides the desired stable suspension. The amount of saponified material present is expressed in the specification and the claims as percent of the total number of originally available carboxyl (—COOH) groups present that have reacted to form the salt (sometimes referred to in the art as "the soap") such, for example, as the sodium salt (—COONa). For convenience, this value is set forth in the working examples as the "degree of saponification." For example, in the examples a "degree of saponification of 4%" indicates that of the originally available carboxyl groups, 4% thereof have reacted with or been saponified with alkali. The degree of saponification can vary from 0.5% to 20%; however, it is preferred to stay in the range of from about 2% to about 4%. Excess soap will detract from sizing properties. It will be appreciated that the acids of which rosin is comprised have one available carboxyl group. In the case where rosin has been reacted with an acidic compound, as above specified, to provide a fortified rosin or an adducted rosin, the reaction product will have additional available carboxyl groups as provided by the reacted acidic compound.

The following examples are illustrative of this invention. All parts and percentages are by weight unless otherwise specified.

EXAMPLE 1

Fumaric acid, 630 parts, is adducted, at elevated temperatures, with fused wood rosin, 3307 parts. The fumaric acid dissolves in the fused wood rosin and reacts therewith to provide a reaction mass. The reaction mass or product, after substantially all the fumaric acid has reacted with the wood rosin, is allowed to cool to room temperature (about 23° C.). The reaction mass is a mixture comprised of unreacted rosin and rosin-fumaric acid reaction product or adduct. The reaction product contains 16% fumaric acid, substantially all of which has been reacted. The reaction product is subsequently hydrogenated to provide a hydrogenated reaction mass having a bromine number of 6 and and acid number of 240. This hydrogenated mass is used in some of the examples that follow.

EXAMPLE 2

A solution is prepared by dissolving 156.2 parts of hydrogenated wood rosin (bromine number 49, acid number 166) and 93.8 parts of the hydrogenated reaction mass of Example 1 in 250 parts of benzene. The solution is thoroughly admixed with a preheated (40° C.) aqueous solution prepared by dissolving 1.96 parts of potassium hydroxide in 498 parts water to provide an oil-in-water emulsion. The potassium hydroxide reacts with some of the carboxyl groups of the rosin and/or rosin-fumaric acid adduct to produce a salt thereof which acts to stabilize the system. The emulsion is passed twice through a commercial homogenizer (preheated to 40° C.) at pressures of from about 3500 p.s.i. to 4000 p.s.i. The product is an oil-in-water emulsion of excellent stability. Substantially all benzene is removed from the oil-in-water emulsion by distillation at reduced pressure to provide an aqueous suspension which is passed through a 325-mesh screen. The aqueous suspension, after passage through the screen, has a solids content of 40%. About 6% of the solids fraction is fumaric acid, substantially all of which is adducted or combined with rosin. The degree of saponification is about 4%. The aqueous suspension is comprised of suspended particles having diameters of from about 0.03 micron to 3 microns.

EXAMPLE 3

A solution is prepared by dissolving 150 parts of formaldehyde-treated wood rosin (acid number 158) and 90 parts of the hydrogenated reaction mass of Example 1 in 240 parts of benzene. This solution is thoroughly admixed with an aqueous solution consisting of 1.96 parts of potassium hydroxide dissolved in 498 parts of water for about two minutes to provide an emulsion. Each solution is preheated to about 35° C. prior to mixing. The emulsion is homogenized as in Example 2 and the benzene solvent subsequently removed by distillation. The product remaining after benzene removal is filtered as in Example 2. The resulting product is a substantially homogeneous aqueous suspension that is stable for prolonged periods of time and has a solids content of 34.3%. About 6% of the solids is adducted fumaric acid. The degree of saponification is about 4%.

EXAMPLE 4

Wood rosin, about 1460 parts, is heated to its fusion temperature to provide a molten mass. To this, 1460 parts of fused wood rosin, there is added 278 parts of fumaric acid. The fumaric acid is added relatively slowly with constant stirring of the resulting mass, while heat is applied, to provide a reaction mass. The resulting reaction mass is subsequently allowed to cool to room temperature (about 23° C.). The reaction mass is a mixture of unreacted rosin and fumaric acid adduct of rosin. The reaction mass contains 16% fumaric acid, substantially all of which is in the combined or adducted form. The reaction mass has an acid number of 277.

EXAMPLE 5

A solution is prepared by dissolving 149.6 parts of hydrogenated wood rosin (bromine number 49, acid number 166) and 89.4 parts of the reaction mass of Example 4 in 239 parts of benzene.

The solution is thoroughly admixed with a solution (preheated to about 35° C.) consisting of 2.1 parts of potassium hydroxide dissolved in 498 parts water to provide an emulsion. The emulsion is homogenized in accordance with the process of Example 2 to provide a homogenized emulsion. The benzene is subsequently substantially all removed from the homogenized emulsion by distillation whereby there is provided an aqueous suspension of 30.4% solids. About 6% of the solids weight is adducted fumaric acid. The degree of saponification is about 4%.

EXAMPLE 6

A solution is prepared by dissolving 147.5 parts of formaldehyde-treated wood rosin having an acid number of 158 and 88.5 parts of the reaction mass of Example 4 in 236 parts of benzene. The solution is added to a solution consisting of 1.85 parts of potassium hydroxide dissolved in 498 parts of water. Formation of an emulsion, homogenization of the emulsion, and removal of benzene to provide a stable aqueous suspension are carried out in a manner similar to that employed in Example 2. The resulting aqueous suspension has a solids content of 33%. About 6% of the solids weight is adducted fumaric acid. The degree of saponification is about 4%.

EXAMPLE 7

About 660 parts of maleic anhydride is adducted with about 3469 parts of wood rosin to provide a reaction mass. The reaction mass contains 16% of its weight of maleic anhydride, substantially all of which is adducted with rosin. The reaction mass is subsequently hydrogenated to provide a reaction mass having a bromine number of 30 and an aqueous saponification number of 312.

EXAMPLE 8

A solution is prepared by dissolving 150.6 parts of hydrogenated wood rosin (bromine number 49, acid number 166) and 90.4 parts of the reaction mass of Example 7 in 241 parts of benzene. The solution is added to a solution consisting of 2.16 parts of potassium hydroxide dissolved in 498 parts of water. Emulsion formation, emulsion homogenization, and benzene removal to provide a stable aqueous suspension are accomplished substantially in the manner described in Example 2. The aqueous suspension has a solids content of about 30.9%. About 6% of the solids weight is adducted maleic anhydride. The degree of saponification is about 4%.

The sizing efficiency of each of the aqueous suspensions of Examples 2, 3, 5, 6 and 8 is tested by preparing handsheets using varying amounts of size solids. To prepare the handsheets, Rayonier bleached kraft pulp is suspended in standard hard water and beaten to 750 ml. S-R freeness in a Noble and Wood cycle beater. Size additions are made to 2-liter portions of the beaten slurry which has been diluted to 2.5% solids by weight. Sufficient alum is added to each sized slurry to provide a pH of about 4.5, and the slurry is then diluted to a consistency of 0.27% in the proportioner, using acid-alum dilution water.

The dilution water is prepared by reducing the pH of water of moderate hardness to 5.0 with sulfuric acid, then adding enough alum to provide 5 p.p.m. soluble aluminum. One-liter portions of proportioner pulp slurry are diluted further with acid-alum dilution water to a deckle box consistency of 0.025% in order to form 40-pound basis weight (24″ x 36″—500 sheet ream) handsheet using a Noble and Wood sheetmaking apparatus. A closed white water system is employed. Formed sheets are wet-pressed to 33% solids, content and then dried to 240° F. on a steam drum drier. All handsheets are conditioned for two days at 72° F. and 50% relative humidity and are tested in this environment. Resistance to penetration by Standard Feather ink is determined by use of the Hercules photometer (D. Price, R. H. Osborn, and J. W. Davis, TAPPI 36, 42, 1953). The time necessary for ink penetration to reduce light reflectance to 85% of the sheet's initial value is used to represent the degree of sizing.

Table I below sets forth photometer sizing results for the sizes of the examples at size concentrations of 0.5%, 1.0%, and 1.5%. The size concentrations are by weight and are based on the weight of the dry pulp. Thus, for example, a 1.0% size concentration indicates that 1% by weight of the solids content of the aqueous suspension of the specified example, based on the weight of the dry pulp, is added.

TABLE I

| Size of Example | Photometer sizing as a function of size concentration, seconds | | |
|---|---|---|---|
| | 0.5% | 1.0% | 1.5% |
| 2 | 170 | 260 | 320 |
| 3 | 123 | 188 | 239 |
| 5 | 153 | 228 | 282 |
| 6 | 132 | 209 | 282 |
| 8 | 113 | 169 | 210 |

These test results indicate that the compositions of this invention, prepared by the process of this invention, are far superior to commercially available rosin sizing agents.

EXAMPLE 9

Formaldehyde-treated wood rosin (acid number of 158), 1683 parts, and fumaric acid, 321 parts, are reacted to provide a reaction mass. The reaction mass contains 16% of its weight of fumaric acid, substantially all of which is in the form of the rosin-fumaric acid adduct. The reaction mass has an acid number of 244.

EXAMPLE 10

A solution is prepared by dissolving 138.5 parts of formaldehyde-treated wood rosin (acid number 158) and 90 parts of the reaction mass of Example 9 in 240.5 parts of benzene. The solution is thoroughly admixed with an aqueous solution consisting of 11.7 parts of sodium resinate (derived by completely saponifying formaldehyde-treated wood rosin having an acid number of 158 with sodium hydroxide) and 480 parts of water to provide an emulsion that is subsequently homogenized in accordance with the method of Example 2 to provide a homogenized emulsion. The homogenized emulsion is heated at temperatures ranging from 30° C. to 42° C., while under partial vacuum, to remove, by distillation, substantially all the benzene. A small amount of water is removed also during distillation. The residue, an aqueous suspension, is passed through a 325-mesh screen. The resulting aqueous suspension is substantially homogeneous and remains stable for prolonged periods of time. The suspension contains 29.3% solids. About 6% of the solids weight is adducted fumaric acid. About 4% of the total carboxyl groups are saponified and this is represented by the sodium resinate of the aqueous solution.

EXAMPLE 11

A solution is prepared by dissolving 105 parts of formaldehyde-treated wood rosin (acid number 158) and 105 parts of the reaction mass of Example 9 in 420 parts of benzene.

The solution is thoroughly admixed with a solution of 1.2 parts of sodium hydroxide dissolved in 628 parts of water to provide an emulsion which is subsequently homogenized to form an homogenized emulsion. The benzene is removed from the emulsion by distillation to provide an aqueous suspension containing 23.6% solids. About 8% of the solids weight is adducted fumaric acid. The degree of saponification is 4%.

EXAMPLE 12

In a manner similar to that described in Example 11, an aqueous suspension is prepared having a solids content of about 26.7%. About 4% of the solids weight is adducted fumaric acid. The degree of saponification is 4%. In this example, 157.5 parts of formaldehyde-treated wood rosin, 52.5 parts of the reaction mass of Example 9, 420 parts of benzene, 1.08 parts of sodium hydroxide, and 629 parts of water are used.

EXAMPLE 13

Example 11 is repeated using 183.7 parts of formaldehyde-treated wood rosin, 26.3 parts of the reaction mass of Example 9, 420 parts benzene, 1.02 parts of sodium hydroxide, and 630 parts of water. The aqueous suspension has a solids content of 25.4%. The degree of saponification is 4%. About 2% of the solids weight is adducted fumaric acid.

EXAMPLE 14

A solution is prepared by dissolving 40 parts of formaldehyde-treated wood rosin (acid number 158) and 120 parts of the reaction mass of Example 9 in 480 parts of benzene. The solution is mixed with a solution of about 1.02 parts of sodium hydroxide dissolved in 639 parts of water and the mixture homogenized to provide a stable emulsion. The benzene is removed from the emulsion by distillation and there is provided an aqueous suspension having a solids content of 17.6%. About 12% of the solids weight is fumaric acid. The degree of saponification is about 4%.

EXAMPLE 15

A solution is prepared by dissolving 150 parts of formaldehyde-treated wood rosin (acid number 158) and 90 parts of the reaction mass of Example 9 in 240 parts of benzene. The solution is added to a solution of 1.3 parts of sodium hydroxide in 479 parts of water to provide a mixture which is homogenized to provide an aqueous emulsion. Benzene is subsequently removed by distillation from the emulsion. The resulting aqueous suspension has a solids content of 30.3%. The degree of saponification is 4%. About 6% of the solids weight is adducted fumaric acid.

EXAMPLE 16

A solution is prepared by dissolving 150 parts of wood rosin (acid number 167) and 90 parts of a 16% fumaric acid adduct of wood rosin prepared in a manner similar to that described in Example 4 (except that the reaction mass was heated for 4 hours at a temperature that varied from about 200° C. to 210° C.) in 240 parts benzene. The solution is thoroughly admixed with an aqueous solution containing 0.97 part of potassium hydroxide dissolved in 479 parts of water, to provide an emulsion which is subsequently treated in accordance with the procedure of Example 2 to provide an aqueous suspension having a 35.4% solids content. The degree of saponification is 2%. The amount of adducted fumaric acid present is about 6% of the solids weight.

EXAMPLE 17

A solution is prepared by dissolving 150 parts of wood rosin (acid number 167) and 90 parts of a 16% fumaric acid adduct of wood rosin prepared in a manner similar to that described in Example 16 in 240 parts benzene. The solution is thoroughly admixed with an aqueous solution containing 2.9 parts of potassium hydroxide dissolved in 477 parts of water to provide an emulsion which is subsequently treated in accordance with the procedure of Example 2 to provide an aqueous suspension having a 32.1% solids content. The degree of saponification is 6%. The amount of adducted fumaric acid present is about 6% of the solids weight.

EXAMPLE 18

Example 16 is repeated using 150 parts of rosin, 90 parts of rosin adduct, 240 parts of benzene, 0.48 part of potassium hydroxide, and 480 parts of water. The aqueous suspension contains 37.2% total solids and 6% of the solids weight is adducted fumaric acid. The degree of saponification is about 1%.

EXAMPLE 19

A solution is prepared by dissolving 150 parts of wood rosin (acid number 167) and 90 parts of a reaction mass prepared in accordance with Example 16 in 240 parts of benzene. The solution is mixed with an aqueous solution of 3.86 parts of potassium hydroxide dissolved in 956 parts of water to provide a mixture which is subsequently homogenized to provide an aqueous emulsion. The benzene is removed from the emulsion by distillation. The resulting aqueous suspension is stable and has a solids content of about 21%. The amount of adducted fumaric acid present is 6% of the solids weight. The degree of saponification is 8%.

Examples 20, 21 and 22 below illustrate the use of terpene hydrocarbon resins consisting of polymerization products of terpene hydrocarbons in the compositions of this invention. Suitable terpene hydrocarbon resins are disclosed and described in application Ser. No. 182,093, filed Mar. 23, 1962, reference to which is hereby made.

Encyclopedia of Chemical Technology, vol. 14, The Interscience Encyclopedia, Inc., New York, 1955, reports that Southern sulfate turpentines are comprised of, by weight, 60% to 65% α-pinene and 25% to 35% β-pinene. Refined Southern sulfate turpentine (200 parts) is added dropwise to an agitated mixture of 450 parts dry toluene and 18 parts aluminum chloride. The temperature during addition is held at 4° C. to 10° C. by cooling. The time of addition is 55 minutes. Reaction is continued at 8–10° C. for 4 hours after turpentine addition is complete. Water (22° C.) is added with agitation while keeping the temperature below 20° C. Fifteen minutes after water addition is complete, 45 parts calcium hydroxide is added and the mixture is warmed and held at 70° C. for 20 minutes. The hot mixture is filtered and the filter cake is washed with toluene, and the washings are combined with the product filtrate. When the filtrate cools, additional solids form which are separated by an additional filtration. The resulting filtrate is stripped using a heated oil bath for heat. Stripping is stopped at 120 mm. pressure with the oil bath at 200° C. The residue is a soft terpene hydrocarbon resin consisting of polymerization products of terpene hydrocarbons and has a molecular weight of 500 (Rast method) and a drop softening point of 75° C. Vacuum topping of this residue provides a residue having a molecular weight of 840 (Rast method) and a drop softening point of 115° C. The distillate consists essentially of terpene dimers and a small amount of terpene trimers and tetramers. Fractionation of this distillate will provide substantially pure terpene dimer which has a boiling point range of 173° C. to 177° C. at 45 mm. Hg pressure.

EXAMPLE 20

A solution is prepared by dissolving 127 parts of wood rosin (acid number 167), 90 parts of a reaction mass (acid number 267) prepared in accordance with Example 16, and 23 parts of a terpene dimer having a boiling point range of from about 173° C. to 177° C. at 45 mm. Hg pressure and prepared as above described in 240 parts of benzene. The solution is admixed with a solution prepared by dissolving 1.96 parts of potassium hydroxide in 478 parts of water, and the resulting mixture is subsequently homogenized to provide a stable emulsion. The benzene is then removed from the emulsion by distillation at atmospheric pressure. An aqueous suspension is obtained which has a 38.9% solids content. The fumaric acid content, substantially all of which is in the adduct form, is 6% of the solids weight. The degree of saponification is about 4%.

EXAMPLE 21

Example 20 is repeated except that a terpene hydrocarbon resin consisting of polymerization products of terpene hydrocarbons and which has a Rast method molecular weight of 500 and a drop softening point of 75° C. is used instead of the terpene dimer to provide an aqueous suspension having a solids content of about 39.5%. About 6% of the solids weight is adducted fumaric acid. The degree of saponification is 4%.

EXAMPLE 22

Example 20 is repeated using a terpene hydrocarbon resin consisting of polymerization products of terpene hydrocarbons and having a Rast method molecular weight of 840 and a drop softening point of about 115° C. instead of terpene dimer. The aqueous suspension has a 39.5% solids content. The amount of adducted fumaric acid is about 6% of the solids weight. The degree of saponification is 4%.

EXAMPLE 23

Example 20 is repeated using refined paraffin wax having a melting point of about 59.5° C. in place of the terpene dimer, 440 parts of benzene instead of 240 parts, and 678 parts of water instead of 478 parts. The solutions are heated to 30–40° C. prior to mixing. The aqueous suspension has a solids content of 28.6% and the degree of saponification is 4%. The adducted fumaric acid present is 6% of the solids weight.

EXAMPLE 24

Example 20 is repeated with the following exceptions. A refined petroleum liquid, available commercially under the proprietary designation Pri mol 205 is used instead of the terpene dimer and both solutions are heated to 30–40° C. prior to mixing. The aqueous suspension contains 38.5% solids, and the degree of saponification is 4%. About 6% of the solids weight is adducted fumaric acid. Primol 205 is a highly refined white hydrocarbon oil having a specific gravity of 0.8713 g./cc. at 25° C., a refractive Index of 1.4756 at 25° C., and a boiling point range of 355° C. to 526° C.

EXAMPLE 25

A solution is prepared by dissolving 150 parts of wood rosin (acid number 167) and 90 parts of a reaction mass (acid number 267) prepared in accordance with Example 16 in 240 parts of benzene. The solution is mixed with a solution prepared by dissolving 1.96 parts of potassium hydroxide in 478 parts of water. Both solutions are heated to about 35° C. prior to mixing. The mixture is homogenized and the benzene removed by distillation to produce an aqueous suspension of 37.7% solids content. The degree of saponification is 4%. About 6% of the solids weight is adducted fumaric acid.

EXAMPLE 25A

A solution is prepared by dissolving 125 parts of wood rosin (acid number 167) and 75 parts of a reaction mass (acid number 267) prepared in accordance with Example 16 in 200 parts of benzene. The solution is mixed with an aqueous solution consisting of 4.9 parts of potassium hydroxide dissolved in 1195 parts of water. The resulting mixture is homogenized and the benzene is removed by distillation to provide an aqueous suspension of 15.4% solids content. The degree of saponification is 12%. About 6% of the solids weight is adducted fumaric acid.

EXAMPLE 25B

Example 25A is repeated except that the benzene solution is added to an aqueous solution consisting of 6.5 parts of potassium hydroxide dissolved in 1194 parts of water. The aqueous suspension has a solids content of 15.3%. The degree of saponification is 16%. About 6% of the solids weight is adducted fumaric acid.

EXAMPLE 26

Example 25 is repeated using a formaldehyde-treated wood rosin (acid number 158) in place of the untreated wood rosin and 1.90 parts of potassium hydroxide instead of 1.96 parts. In addition the solutions are not heated prior to mixing but are at room temperature (about 23° C.). The aqueous suspension has a solids content of 37.5% and a degree of saponification of 4%. The fumaric acid present in the suspension is 6% of the solids weight and substantially all the acid is in the form of a rosin adduct.

EXAMPLE 27

Example 26 is repeated using tall oil rosin (acid number 171) in place of formaldehyde-treated topped wood rosin. A 37.4% solids suspension is obtained. The degree of saponification is 4%, and the fumaric acid content is 6% of the solids weight.

EXAMPLE 28

Example 26 is repeated using, instead of formaldehyde-treated wood rosin, formaldehyde-treated tall oil rosin (acid number 162). The stable aqueous suspension has a solids content of 39% and a degree of saponification of 4%. Fumaric acid content is 6% of the solids weight and the fumaric acid is adducted.

EXAMPLE 29

Example 26 is repeated using hydrogenated wood rosin (acid number 163) in place of formaldehyde-treated wood rosin. The stable aqueous suspension has a solids content of 38.2% and a degree of saponification of 4%. Fumaric acid content is 6% of the solids weight and substantially all the fumaric acid is in the form of an adduct.

EXAMPLE 30

A solution is prepared by dissolving 200 parts of a reaction mass (acid number 259) prepared in accordance with Example 9 (except that the reaction mass is held for 4 hours at 200° C.-210° C.) in 600 parts of benzene. The solution is mixed with an aqueous solution of 2.07 parts of potassium hydroxide dissolved in 798 parts of water. The resulting mixture is homogenized to provide a stable emulsion from which benzene is subsequently removed by distillation. A stable aqueous suspension is produced which contains 19.6% solids and which has a degree of saponification of about 4%. About 16% of the solids weight is adducted fumaric acid.

EXAMPLE 31

About 3241 parts of formaldehyde-treated tall oil rosin (acid number 162) is fused and then reacted with 617 parts of fumaric acid to provide a reaction mass. The reaction mass, which has an acid number of 249, contains unreacted tall oil rosin and tall oil rosin-fumaric acid adduct. About 16% of the reaction mass weight is fumaric acid, substantially all of which is in the form of the rosin adduct.

EXAMPLE 32

A solution is prepared by dissolving 50 parts of formaldehyde-treated tall oil rosin (acid number 162) and 150 parts of the reaction mass of Example 31 in 200 parts of benzene. The solution is mixed with an aqueous solution of 1.3 parts sodium hydroxide dissolved in 399 parts water. The mixture is homogenized and the solvent stripped therefrom by distillation. The resulting stable aqueous suspension has a 32.8% solids content and about 12% of the solids weight is fumaric acid, substantially all of which is in the adducted form. The degree of saponification is 4%.

EXAMPLE 33

Example 32 is repeated using 100 parts of formaldehyde-treated tall oil rosin, 100 parts of Example 27 reaction mass, 200 parts of benzene, 1.18 parts of sodium hydroxide, and 399 parts of water. The aqueous suspension has a 33.9% solids content and about 8% of the solids weight is fumaric acid, substantially all of which is in the adducted form. The degree of saponification is about 4%.

EXAMPLE 34

Example 32 is repeated using 150 parts formaldehyde-treated tall oil rosin, 50 parts of Example 27 reaction mass, 200 parts benzene, 1.06 parts sodium hydroxide, and 399 parts of water. A stable aqueous suspension is obtained which has a 35.5% solids content and about 4% of the solids weight is adducted fumaric acid. The degree of saponification is 4%.

EXAMPLE 35

Example 31 is repeated using 2350 parts of rosin and 320 parts of fumaric acid and a three-hour reaction time instead of four. The reaction mass has an acid number of 234 and contains about 12% of its weight of fumaric acid substantially all of which is adducted with the rosin.

EXAMPLE 36

A solution is prepared by dissolving 133 parts of formaldehyde-treated tall oil rosin (acid number 162) and 267 parts of the reaction mass of Example 35 in 400 parts of benzene. The solution is mixed with an aqueous solution of 2.44 parts sodium hydroxide in 798 parts water, the mixture homogenized and the benzene component removed by distillation. The aqueous suspension thus prepared has a 36.8% solids content. About 8% of the solids weight is fumaric acid, substantially all of which is in the form of the adduct. The degree of saponification is 4%.

EXAMPLE 37

Example 36 is repeated using 133 parts of formaldehyde-treated tall oil rosin (acid number 162), 67 parts of Example 35 reaction mass, 200 parts of benzene, 1.08 parts of sodium hydroxide, and 399 parts of water. The aqueous suspension has a solids content of 34.5% and the degree of saponification is 4%. About 4% of the solids weight is fumaric acid, substantially all of which is in the form of the adduct.

EXAMPLE 38

A solution is prepared by dissolving 125 parts of hydrogenated rosin (acid number 163) and 775 parts of a reaction mass prepared by the Example 16 procedure in 280 parts of carbon tetrachloride. The solution is mixed with an aqueous solution of 1.16 parts sodium hydroxide dissolved in 479 parts of water. The mixture is homogenized and the carbon tetrachloride removed by distillation to provide a stable aqueous suspension having a 31.7% solids content. Of the solids weight, about 6% is fumaric acid, substantially all of which is in the adducted form. The degree of saponification is 4%.

EXAMPLE 39

A solution is prepared in accordance with Example 38 using 200 parts of propylene dichloride in place of the 280 parts of carbon tetrachloride. The solution is mixed with an aqueous solution of 1.16 parts sodium hydroxide dissolved in 399 parts water and the mixture homogenized. The propylene dichloride is removed by distillation to provide an aqueous suspension of 34.8% solids content and having a degree of saponification of 4%. The fumaric acid content is about 6% of the solids weight, substantially all of which is adducted.

EXAMPLE 40

Example 39 is repeated using toluene in place of the propylene dichloride. The aqueous suspension prepared has a 36.6% solids content and the degree of saponification is 4%. Fumaric acid represents about 6% of the solids weight, substantially all of which is adducted.

EXAMPLE 41

A solution is prepared in accordance with Example 38 except that 277 parts of n-heptane is used in place of the 280 parts of carbon tetrachloride. The solution (42% solids) is mixed with an aqueous solution of 1.16 parts sodium hydroxide dissolved in 479 parts water and the mixture homogenized to provide an aqueous emulsion. The n-heptane is subsequently removed by distillation to provide a stable aqueous suspension of 31.2% solids content having a degree of saponification of 4%. About 6% of the solids weight is fumaric acid, substantially all of which is adducted.

EXAMPLE 42

A solution is prepared by dissolving 125 parts of hydrogenated rosin (acid number 163) and 75 parts of a reaction mass prepared by the procedure of Example 16 in 200 parts of benzene. The solution is added to an aqueous solution consisting of 1.54 parts of sodium carbonate dissolved in 398 parts of water. The resulting mixture is homogenized, and the benzene substantially all removed by distillation to provide a stable aqueous suspension having a 36.7% solids content. About 6% of the solids weight is fumaric acid, substantially all of which is in the form of the adduct. The degree of saponification is 4%.

EXAMPLE 43

A solution is prepared in accordance with Example 42. The solution is added to an aqueous solution of 1.04 parts of ammonium hydroxide (0.51 part of $NH_3$) dissolved in 399 parts of water. The resulting mixture is homogenized and the benzene substantially all removed therefrom by distillation whereby there is provided a stable aqueous suspension of 33.9% solids content. About 6% of the solids weight is fumaric acid, substantially all of which is in the adducted form. The degree of saponification is 4%.

EXAMPLE 44

A benzene solution is prepared in accordance with Example 42, and this solution is admixed with an aqueous solution consisting of 2.5 parts of morpholine dissolved in 398 parts of water. The mixture is homogenized to provide a substantially stable aqueous emulsion from which the benzene is subsequently removed by distillation. The resulting product is an aqueous suspension having a solids content of about 35.4%. About 6% of the solids weight is fumaric acid, substantially all of which is in the form of an adduct. The degree of saponification is 4%.

EXAMPLE 45

About 306 parts of maleic anhydride is reacted with about 1607 parts of fused wood rosin to provide a reaction mass. The reaction mass is a mixture of maleic anhydride adduct of rosin and unadducted rosin and contains about 16% maleic anhydride, substantially all of which is in the adducted form. The reaction mass has an aqueous saponification number of 324.

EXAMPLE 46

About 50 parts of the reaction mass of Example 45 and 150 parts of hydrogenated wood rosin (acid number 163) are dissolved in 200 parts of benzene to provide a solution. The solution is added to an aqueous solution of 1.16 parts of sodium hydroxide dissolved in 399 parts of water. The resulting mixture is homogenized and the benzene subsequently removed therefrom by distillation to provide a stable aqueous dispersion having a solids content of about 34%. Of the solids weight, about 4% thereof is maleic anhydride, substantially all of which is in the combined or adducted form. The degree of saponification is 4%.

EXAMPLE 47

About 100 parts of the reaction mass of Example 45 and 100 parts of hydrogenated wood rosin (acid number 163) are dissolved in 200 parts of benzene to provide a solution. The solution is added to an aqueous solution of 1.39 parts of sodium hydroxide dissolved in 399 parts of water. The resulting mixture is homogenized and the benzene subsequently removed therefrom by distillation to provide a stable aqueous dispersion having a solids content of about 31.6%. Of the solids weight, about 8% thereof is maleic anhydride, substantially all of which is in the combined or adducted form. The degree of saponification is 4%.

EXAMPLE 48

About 150 parts of the reaction mass of Example 45 and 50 parts of hydrogenated wood rosin (acid number 163) are dissolved in 200 parts of benzene to provide a solution. The solution is added to an aqueous solution of 1.62 parts of sodium hydroxide dissolved in 398 parts of water. The resulting mixture is homogenized and the benzene subsequently removed therefrom by distillation to provide a stable aqueous dispersion having a solids content of about 31.6%. Of the solids weight, about 12% thereof is maleic anhydride, substantially all of which is in the combined or adducted form. The degree of saponification is 4%.

EXAMPLE 49

About 200 parts of the reaction mass of Example 45 is dissolved in 200 parts of benzene to provide a solution. The solution is added to an aqueous solution of 1.86 parts of sodium hydroxide dissolved in 398 parts of water. The resulting mixture is homogenized and the benzene subsequently removed therefrom by distillation to provide a stable aqueous dispersion having a solids content of about 33.4%. Of the solids weight, about 16% thereof is maleic anhydride, substantially all of which is in the combined or adducted form. The degree of saponification is 4%.

EXAMPLE 50

About 128 parts of hydrogenated wood rosin (acid number 161.5) and 68 parts of a reaction mass prepared in a manner similar to that of Example 4 and which has an acid number of 262 are dissolved in 200 parts of benzene. The resulting benzene solution is mixed with an aqueous solution consisting of 396 parts of water and 4 parts of essentially pure fumaric acid adduct of abietic acid (melting point 246° C.–250° C., acid number 393) which has been completely neutralized by a stoichiometric amount of sodium hydroxide. The resulting mixture is homogenized to provide a stable emulsion from which substantially all the benzene is then removed by distillation. The resulting product is a stable aqueous suspension having a solids content of 34.4%. About 6% of the solids weight is fumaric acid, substantially all of which is in the combined or adducted form. The degree of saponification is 4%.

EXAMPLE 51

A benzene solution is prepared in accordance with Example 50 and is added to an aqueous solution of 4.45 parts of a recrystallized fumaric acid adduct of abietic acid which contains 2.5 moles of water of crystallization (acid number 363) dissolved in 396 parts of water. The adduct, prior to dissolution in the water, is substantially completely neutralized by a stoichiometric amount of sodium hydroxide. The mixture which results is homogenized and the benzene substantially all removed therefrom by distillation whereby there is provided a stable aqueous suspension of 34.9% solids content. About 6% of the solids weight is fumaric acid, substantially all of which is in the adducted form. The degree of saponification is 4%.

EXAMPLE 52

About 110 parts of fumaric acid is reacted with 1272 parts of tall oil rosin to provide a reaction mass. The reaction mass is a mixture of fumaric acid adduct of rosin and unreacted or unadduceed rosin and contains 8% fumaric acid substantially all of which is in the combined or adducted form. The reaction mass has an acid number of 222.

EXAMPLE 53

A solution is prepared by dissolving 50 parts of tall oil rosin (acid number 171) and 150 parts of the reaction mass of Example 52 in 200 parts of benzene. The solution is added to an aqueous solution of 1.2 parts of sodium hydroxide dissolved in 399 parts of water. The resulting mixture is homogenized and the benzene substantially all removed therefrom by distillation. The resulting product is a stable aqueous suspension having a solids content of 33.9%. About 6% of the solids weight is fumaric acid, substantially all of which is in the adducted form. The degree of saponification is 4%.

EXAMPLE 54

About 102 parts of fumaric acid is reacted with about 750 parts of gum rosin to provide a reaction mass. The reaction mass is a mixture of fumaric acid adduct of gum rosin and unreacted rosin and contains about 12% fumaric acid, substantially all of which is in the combined or adducted form. The reaction mass has an acid number of 242.

EXAMPLE 55

A solution is prepared by dissolving 100 parts of gum rosin having an acid number of 168 and 100 parts of the reaction mass of Example 54 in 200 parts of benzene. The solution is added to an aqueous solution consisting of 1.18 parts of sodium hydroxide dissolved in 399 parts of water. The mixture is homogenized and the benzene component subsequently removed therefrom by distillation whereby there is provided a stable aqueous suspension having a solids content of 34.4%. About 6% of the solids weight is fumaric acid, substantially all of which is in the form of an adduct. The degree of saponification is 4%.

EXAMPLE 56

About 173 parts of fumaric acid is reacted, at elevated temperatures, with about 1273 parts of fused FF rosin to provide a reaction mass. The reaction mass is a mixture of the fumaric acid adduct of rosin and unreacted rosin and contains 12% fumaric acid, substantially all of which is in the adducted or combined form. The reaction mass has an acid number of 225.

EXAMPLE 57

A solution is prepared by dissolving 100 parts of FF rosin having an acid number of 154 and 100 parts of the reaction mass of Example 56 in 200 parts of benzene. The solution is admixed with an aqueous solution of 1.08 parts of sodium hydroxide dissolved in 399 parts of water. The mixture is subsequently homogenized to provide a stable aqueous emulsion. The aqueous emulsion is subjected to distillation whereby substantially all the benzene component is removed therefrom and there is provided a stable aqueous suspension having a solids content of about 30.5%. About 6% of the solids weight is fumaric acid, substantially all of which is in the adducted or combined form. The degree of saponification is 4%.

EXAMPLE 58

A solution is prepared by dissolving 100 parts of Belro rosin which has an acid number of 111 and 100 parts of the reaction mass of Example 56 in 200 parts of benzene. Belro is a proprietary designation for a residue from selective solvent refining of FF wood rosin, the residue being characterized by an acid number of 105 to 140, a saponification number of 150 to 170, a drop melting point of 80° C. to 115° C., an unsaponifiable matter content of 10% to 20%, a gasoline insolubility of 30% to 80%, and a petroleum ether insolubility content of 30% to 80%. The solution is added to an aqueous solution consisting of 1 part sodium hydroxide dissolved in 399 parts of water. The mixture is homogenized and benzene is removed by distillation to provide an aqueous suspension having a 34.9% solids content. About 6% of the solids weight is adducted fumaric acid. The degree of saponification is 4%.

EXAMPLE 59

A solution is prepared by dissolving 127 parts of wood rosin (acid number 167), 23 parts of the rosin ester of ethylene glycol, and 90 parts of a 16% by weight fumaric acid adduct of rosin (acid number 262) prepared in a manner similar to that of Example 16 in 240 parts of benzene. The benzene solution is mixed with an aqueous solution of 1.9 parts potassium hydroxide dissolved in 478 parts of water. The resulting mixture is homogenized and the benzene removed therefrom by distillation. The resulting aqueous emulsion has a solids content of 33.9%, 6% of the solids weight being adducted fumaric acid. The degree of saponification is about 4%.

EXAMPLE 60

Example 59 is repeated using 122 parts of rosin, 22 parts of rosin ester of pentaerythritol, 87 parts of the 16% by weight fumaric acid adduct of rosin, and 231 parts benzene. The solids content of the resulting aqueous suspension is 36.6%. The degree of saponification is 4% and 6% of the solids weight is adducted fumaric acid.

EXAMPLE 61

Example 59 is repeated using 127 parts of rosin, 23 parts of rosin ester of methanol, 90 parts of 16% fumaric acid adduct of rosin and 240 parts of benzene. The solids content of the aqueous suspension thus produced is 37.5%. The degree of saponification is 4% and 6% of the solids weight is adducted fumaric acid.

EXAMPLE 62

A solution is prepared by dissolving 125 parts of hydrogenated wood rosin having an acid number of 161.5 and 75 parts of a 16% by weight fumaric acid adducted wood rosin having an acid number of 262 in 200 parts of benzene. The solution is added to an aqueous solution consisting of 1.28 parts of ethylamine dissolved in 399 parts of water. The resulting mixture is homogenized and the benzene removed therefrom by distillation. The resulting aqueous suspension has a solids content of 33.8%, about 6% of the solids weight being fumaric acid, substantially all of which is in its adducted form. About 4% of the total carboxyl groups originally present were saponified by the ethylamine.

EXAMPLE 63

Example 62 is repeated except that the benzene solution is added to an aqueous solution of 1.66 parts of n-propylamine dissolved in 399 parts of water. The aqueous suspension contains 32.5% solids, 6% of the solids weight being adducted fumaric acid. About 4% of the originally present carboxyl groups are saponified by the n-propylamine.

EXAMPLE 64

Example 62 is repeated except that the benzene solution is added to an aqueous solution of 2.05 parts of n-butylamine dissolved in 398 parts of water. The aqueous suspension contains 32.8% solids, 6% of the solids weight being adducted fumaric acid. About 4% of the originally present carboxyl groups are saponified by the n-butylamine.

With the exception of the aqueous suspensions of Examples 57 and 58, sizing efficiencies of the above aqueous suspensions are tested by the method employed for testing the sizing efficiencies of the aqueous suspensions of Examples 2, 3, 5, 6 and 8. The aqueous suspensions of Examples 57 and 58 are tested in a similar manner with the following exceptions. Unbleached kraft pulp is beaten to 750 freeness. Amounts of size added to pulp slurries are 0.25%, 0.5%, and 0.75%. After the size is added to a 2-liter portion of 2.5% pulp slurry, the slurry is adjusted to a pH of 5.5 by alum addition. Dilution of the sized and alumed slurry is accomplished by using water which has been acidified to a pH of 5.5 with sulfuric acid.

Tables II and III, below, set forth photometer sizing results.

TABLE II

| Size of Example | Photometer sizing as a function of size concentration, seconds | | |
|---|---|---|---|
| | 0.5% | 1.0% | 1.5% |
| 10 | 140 | 198 | 273 |
| 11 | 128 | 211 | 243 |
| 12 | 85 | 147 | 219 |
| 13 | 56 | 120 | 162 |
| 14 | 150 | 182 | 316 |
| 15 | 109 | 186 | 259 |
| 16 | 144 | 218 | 294 |
| 17 | 126 | 210 | 258 |
| 18 | 140 | 205 | 296 |
| 19 | 141 | 209 | 238 |
| 20 | 152 | 226 | 327 |
| 21 | 141 | 248 | 312 |
| 22 | 149 | 235 | 290 |
| 23 | 103 | 179 | 229 |
| 24 | 135 | 211 | 283 |
| 25 | 135 | 228 | 310 |
| 25A | 118 | 212 | 259 |
| 25B | 112 | 218 | 248 |
| 26 | 169 | 307 | 318 |
| 27 | 114 | 207 | 274 |
| 28 | 136 | 264 | 300 |
| 29 | 198 | 289 | 364 |
| 30 | 150 | 241 | 280 |
| 32 | 99 | 190 | 257 |
| 33 | 111 | 199 | 249 |
| 34 | 60 | 129 | 174 |
| 36 | 158 | 254 | 319 |
| 37 | 79 | 156 | 209 |
| 38 | 178 | 282 | 342 |
| 39 | 162 | 282 | 366 |
| 40 | 197 | 300 | 322 |
| 41 | 177 | 271 | 319 |
| 42 | 180 | 257 | 345 |
| 43 | 178 | 260 | 319 |
| 44 | 194 | 249 | 313 |
| 46 | 115 | 182 | 237 |
| 47 | 140 | 193 | 247 |
| 48 | 156 | 231 | 282 |
| 49 | 194 | 289 | 347 |
| 50 | 176 | 237 | 300 |
| 51 | 173 | 249 | 288 |
| 53 | 107 | 179 | 229 |
| 55 | 118 | 213 | 255 |
| 59 | 141 | 230 | 305 |
| 60 | 134 | 197 | 258 |
| 61 | 131 | 202 | 253 |
| 62 | 205 | 320 | |
| 63 | 204 | 326 | |
| 64 | 179 | 340 | |

TABLE III

| Size of Example | Photometer sizing as a function of size concentration, seconds | | |
|---|---|---|---|
| | 0.25% | 0.5% | 0.75% |
| 57 | 115 | 253 | 436 |
| 58 | 132 | 156 | 243 |

In preparing the aqueous suspensions of this invention in accordance with the process of this invention, up to about 20% by weight of the rosin component can be replaced with a material that is sometimes referred to in the art as a rosin extender such as rosin esters and paraffin wax. Examples of the rosin extenders include terpene hydrocarbon polymers consisting of the polymerization products of terpene hydrocarbons such as those disclosed in Pat. 3,193,449, reference to which is hereby made, and petroleum hydrocarbon resins derived from petroleum by polymerization of hydrocarbons having double bond unsaturation which are produced as a by-product in the course of the cracking distillation of petroleum. The composition of a petroleum hydrocarbon resin will be varied owing to the type of crude oil from which it is derived, and also to the conditions under which cracking, distillation, and separation of petroleum are carried out. In general, a petroleum hydrocarbon resin is a material obtained from the polymerization of mixtures of aliphatic and cyclic compounds having some double bond unsaturation. The resin has a softening point of 30° C. to 130° C., a color (rosin standard) X–D, a specific gravity ($d_{15}^{15}$) 0.9–1.20, an acid value less than 1.0, and an iodine value (Wijs method) of 30–230.

As above set forth, solution (2) is comprised of a solvent (c). Since the solvent (c) is removed during the process of this invention, the amount employed to produce solution (2) should, for economic reasons, be kept to a minimum. It will be apparent to those skilled in the art that the amount of solvent employed can be varied over a relatively wide range, the minimum amount being that required to dissolve component (a), when present, and component (b), preferably under room temperature conditions, and the maximum amount being governed primarily by economic considerations. The amount of solids (a) and (b) will usually be that desired in the final aqueous suspension. The solids content of an aqueous suspension can be increased, if desired, by removing some of the water, preferably by distillation. In preparing the solution (2) for use in this invention, it is recommended that the solution be comprised of 25 parts to 100 parts by weight of total solids for each 100 parts by weight of solvent (c).

The amount of alkaline material employed in preparing aqueous medium (1) can be varied and will depend on the specific alkaline material employed and is within the skill of those versed in the art. For example, when sodium hydroxide is employed as the alkaline material, it is preferred to use about 0.036 part to 0.5 part by weight thereof for each 100 parts by weight of water. When potassium hydroxide is used, it is prferred to use about 0.05 part to 0.7 part by weight thereof for each 100 parts by weight of water.

In preparing the aqueous emulsions prior to solvent removal, the amounts of solution (2) employed and aqueous medium (1) employed will depend on the composition of each and will depend usually on the desired composition of the end product aqueous suspension. As above set forth, after solvent removal, some of the water can be removed to provide an aqueous suspension of higher solids content. The determination of the amounts of aqueous medium (1) and solution (2) is within the skill of those versed in the art having before them the teachings of this invention. Thus, for example, having determined the composition of solution (2), the amount of aqueous medium (1) admixed therewith will have sufficient alkaline material present to provide the desired amount of saponified carboxyl groups such, for example, as the desired amount of —COONa groups, in the end product. In general the ratio of weight of aqueous medium (1) to solution (2) can be varied successfully from 1:1 to 3:1. The amount of aqueous medium used must be adequate to prevent inversion of the primary emulsion. Economic considerations will limit excess use of water, as excess water produces a suspension of relatively low solids content for shipment, storage and the like. Shipment and/or storage of water, particularly when unnecessary, is undesirable and expensive.

While the above description of this invention has been directed to the use of the novel aqueous suspension in the manufacture of sized paper, it is to be understood that such is not the sole use of the aqueous suspensions. Thus, the aqueous suspensions can be used to provide protective coatings on base members such as wood, glass, ceramics, metals, plastics, and the like. For example, an aqueous suspension prepared in accordance with this invention can be applied to a wood base member by brush application, spray application, or the like, and the water subsequently removed from the applied suspension by the application of heat. The resulting article is comprised of the wood base member and an adherent coating of rosin-base material.

It is to be understood that the above description and specific examples are illustrative of this invention and not in limitation thereof.

What I claim and desire to protect by Letters Patent is:

1. A substantially homogeneous stable aqueous suspension of finely divided particles having a particle size of from about 0.03 micron to about 3 microns, said aqueous suspension consisting essentially of, by weight, from about 95% to about 40% water and from about 5% to about 60% rosin-base material, the rosin-base material being comprised of, by weight, from 0% to about 95% rosin and from 100% to about 5% of an adduct reaction product of rosin and an acidic compound containing the

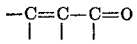

group, the amount of adducted acidic compound being from about 1% to about 20% of the weight of the rosin-base material, a relatively small amount of rosin-base material being saponified rosin-base material which functions as dispersing agent for the suspension, the amount of saponified rosin-base material, represented as a percentage of available carboxyl groups saponified, being from about 0.5% to about 20%.

2. A substantially homogeneous stable aqueous suspension of finely divided particles having a particle size of from about 0.03 micron to about 3 microns, said aqueous suspension consisting essentially of, by weight, from about 70% to about 55% water and from about 30% to about 45% rosin-base material, the rosin-base material being comprised of, by weight, from 0% to about 75% rosin and from 100% to about 25% of an adduct reaction product of rosin and an acidic compound containing the

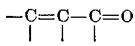

group, the amount of adducted acidic compound being from about 4% to about 8% of the weight of rosin-base material, a relatively small amount of the rosin-base material being saponified rosin-base material which functions as dispersing agent for the suspension, the amount of saponified rosin-base material, represented as a percentage of available carboxyl groups saponified, being from about 2% to about 4%.

3. The suspension of claim 2 wherein the acidic compound containing the

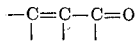

group is selected from the group consisting of maleic acid, maleic anhydride, and fumaric acid.

4. The suspension of claim 2 wherein the saponified rosin-base material is selected from the group consisting of the sodium salt of rosin, the sodium salt of an adduct reaction product of rosin and an acidic compound containing the

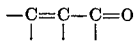

group, the potassium salt of rosin, the potassium salt of an adduct reaction product of rosin and an acidic compound containing the

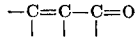

group, the ammonium salt of rosin, the ammonium salt of an adduct reaction product of rosin and an acidic compound containing the

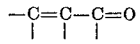

group, and mixtures thereof.

5. In the process of manufacturing a sized paper web wherein there is employed in admixture with an aqueous suspension of papermaking fibers an aqueous size composition, followed by forming a web of the thus prepared admixture, and drying of the prepared web, the improvement wherein there is employed as the aqueous size composition the aqueous suspension of claim 1.

6. In the process of manufacturing a sized paper web wherein there is employed in admixture with an aqueous suspension of papermaking fibers an aqueous size composition, followed by forming a web of the thus prepared admixture, and drying of the prepared web, the improvement wherein there is employed as the aqueous size composition the aqueous suspension of claim 2.

7. A paper product comprised of papermaking fibers sized with a rosin-base material comprised of, by weight, from 0% to about 75% rosin and from 100% to about 25% of an adduct reaction product of rosin and an acidic compound containing the

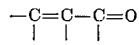

group, the amount of adducted acidic compound being from about 4% to about 8% of the weight of rosin-base material, a relatively small amount being saponified rosin-base material, the amount of saponified rosin-base material, represented as a percentage of available carboxyl groups saponified being from about 2% to about 4%.

8. The substantially homogenous stable aqueous suspension of claim 1 wherein the amount of saponified rosin-base material, represented as a percentage of carboxyl groups saponified, is from about 2% to about 4%.

References Cited
UNITED STATES PATENTS

| | | | |
|---|---|---|---|
| 2,268,112 | 12/1941 | Dreshfield | 106—238X |
| 2,628,918 | 2/1953 | Wilson | 106—238 |
| 2,684,300 | 7/1954 | Wilson | 106—238 |

S. LEON BASHORE, Primary Examiner

R. H. ANDERSON, Assistant Examiner

U.S. Cl. X.R.

106—238; 162—180; 260—27, 105